United States Patent [19]
Williams et al.

[11] Patent Number: 5,375,879
[45] Date of Patent: Dec. 27, 1994

[54] VEHICLE SLEEPER RESTRAINT

[75] Inventors: Jeffry L. Williams, Zionsville; Keith H. Freeman, Cicero, both of Ind.

[73] Assignee: Indiana Mills & Manufacturing, Inc., Westfield, Ind.

[21] Appl. No.: 104,855

[22] Filed: Aug. 10, 1993

[51] Int. Cl.$^5$ .............................................. B60R 21/06
[52] U.S. Cl. .................................. 280/749; 297/487; 5/118; 296/24.1
[58] Field of Search ................. 280/748, 749, 801.1; 297/487, 464, 468, 481; 5/424, 425, 118, 9.1; 296/24.1, 190

[56] References Cited

U.S. PATENT DOCUMENTS

| | | | |
|---|---|---|---|
| 3,692,327 | 9/1972 | Barrick, Sr. et al. | 280/749 |
| 3,695,698 | 10/1972 | Trump | 297/487 |
| 4,141,093 | 2/1979 | Marsden | 5/9.1 |
| 4,592,523 | 6/1986 | Herndon | 244/122 |
| 4,598,931 | 7/1986 | Miyada | 280/749 |

Primary Examiner—Mitchell J. Hill
Assistant Examiner—Paul N. Dickson
Attorney, Agent, or Firm—Woodard, Emhardt, Naughton, Moriarty & McNett

[57] ABSTRACT

A collapsible occupant restraint system for a vehicle sleeper. A net is fixedly mounted to a web framework. The framework is slidably mounted to a plurality of webs extendable and retractable by retracting devices. The net and webbing is extendable from a stored collapsed position to an in use position over a bed having buckles to lockingly engage a plurality of tongues mounted to the framework securing the occupant restraint system in the in use position. A pair of side belts pull the net upwardly increasing the passenger reclining space.

15 Claims, 8 Drawing Sheets

VEHICLE SLEEPER RESTRAINT

BACKGROUND OF THE INVENTION

This invention is in the field of occupant restraint systems for limiting movement of a passenger within a vehicle and particularly those occupant restraint systems for use when the passenger is reclining.

Description of the Prior Art

Semi-trailer cabs include sleeping compartments which may be used by a passenger while the vehicle is in motion. Typically, a sofa or bed extends across the width of the cab with a variety of harnesses, straps, and nets provided to limit movement of the reclining passenger during an emergency stop. Two such web or net constructions for use with a bed are disclosed in the U.S. Pat. No. 3,695,698 issued to Trump and U.S. Pat. No. 4,141,093 issued to Marsden. Other types of nets or harnesses have been designed to enclose the passenger sitting upright in a seat. Such is shown in the U.S. Pat. No. 3,692,327 issued to Barrick, Sr. et al, U.S. Pat. No. 4,592,523 issued to Herndon and U.S. Pat. No. 4,598,931 issued to Miyada.

It is desirable to provide a convenient means for storing the restraining device when not in use. It is the custom to use take up spools or retractors for withdrawing seat belts when not in use. Similarly, spool take up devices or retractors have been used to withdraw individual webs for restraining a reclining passenger on a sofa or bed. In such a case, the webs are interconnected together and must first be separated in order to allow the webs to be individually withdrawn into their respective retracting devices. It has, therefore, not been possible to use a net or similar restraining device in conjunction with retractable webs since the net prevents the webs from being withdrawn into the retracting devices. Disclosed herein is a combination web and net arrangement designed to allow the webs to be withdrawn into retracting devices facilitating the storage of the restraining system without the necessity of disassembling the web prior to storage.

In some of the prior restraining systems utilizing nets, the net has been draped over and in contact with the reclining passenger. Alternatively, due to the limited ceiling elevation, the net is positioned fairly close to the reclining passenger thereby limiting movement of the passenger in non emergency normal operation condition. In order to eliminate this disadvantage with the prior occupant restraint systems, the occupant restraint system disclosed herein is pulled upwardly to maximize the sleeping envelope while at the same tinge providing significant occupant restraint protection in the event the emergency involves a 90° or 180° rollover of the truck and sleeping compartment.

SUMMARY OF THE INVENTION

One embodiment of the present invention is a occupant restraint system for a passenger reclining on a support in a vehicle comprising a plurality of flexible frame elements having proximal ends fixedly mounted to the vehicle and further having distal ends. The elements have a stored position and an in use position. First fastening devices are mounted to the distal ends of the frame elements and second fastening devices are mounted to the vehicle with the support located between the first fastening devices and the second fastening devices when the elements are in the stored position. The first fastening devices and the second fastening devices are operable to releasably lock together when the flexible frame elements are moved above and across the support from the stored position to the in use position and the first fastening devices and the second fastening devices are engaged together. A plurality of webs are slidably mounted to the elements and have distal ends secured to the first fastening devices and further have proximal ends. A net is fixedly mounted to the elements and web retractors are mounted to the vehicle with the proximal ends of the webs mounted thereto. The retractors are operable to retract the webs when the first fastening devices and the second fastening devices are separated with the net sliding with the elements on the webs and collapsing into the stored position.

It is an object of the present invention to provide a new and improved occupant restraint system for use by a reclining passenger within a vehicle.

A further object of the present invention is to provide a sleeper occupant restraint system which may be easily retracted to a stored position without disassembly of the inner-connected webs and net.

In addition, it is an object of the present invention to provide a sleeper occupant restraint system having a maximum envelope in which the passenger may recline.

Related objects and advantages of the present invention will be apparent in the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
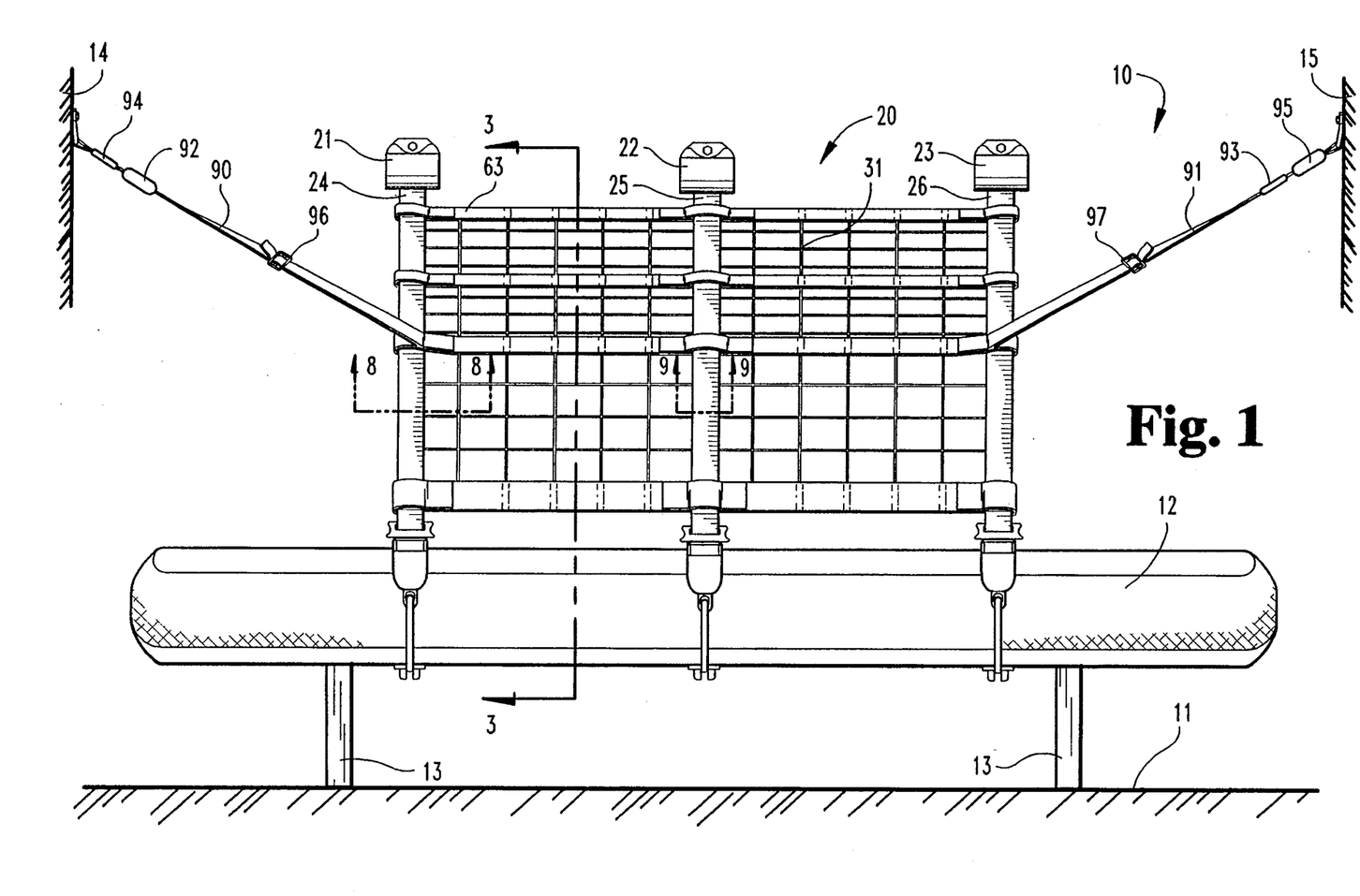
FIG. 1 is a front view of a sleeper compartment having the occupant restraint system incorporating the present invention shown in the in use position.
Figure 2:
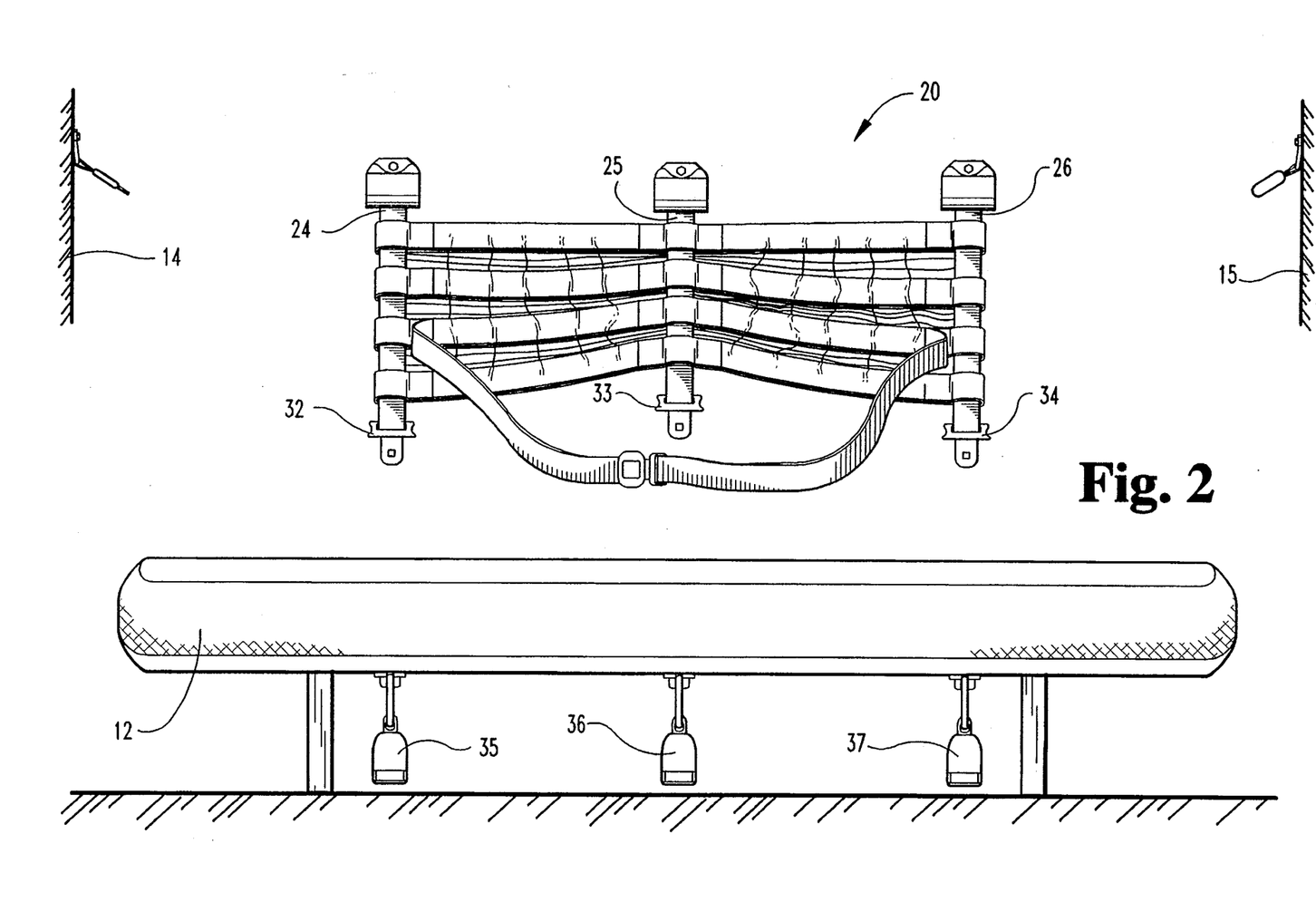
FIG. 2 is the same view as FIG. 1 except showing the occupant restraint system in the stored position.
Figure 3:
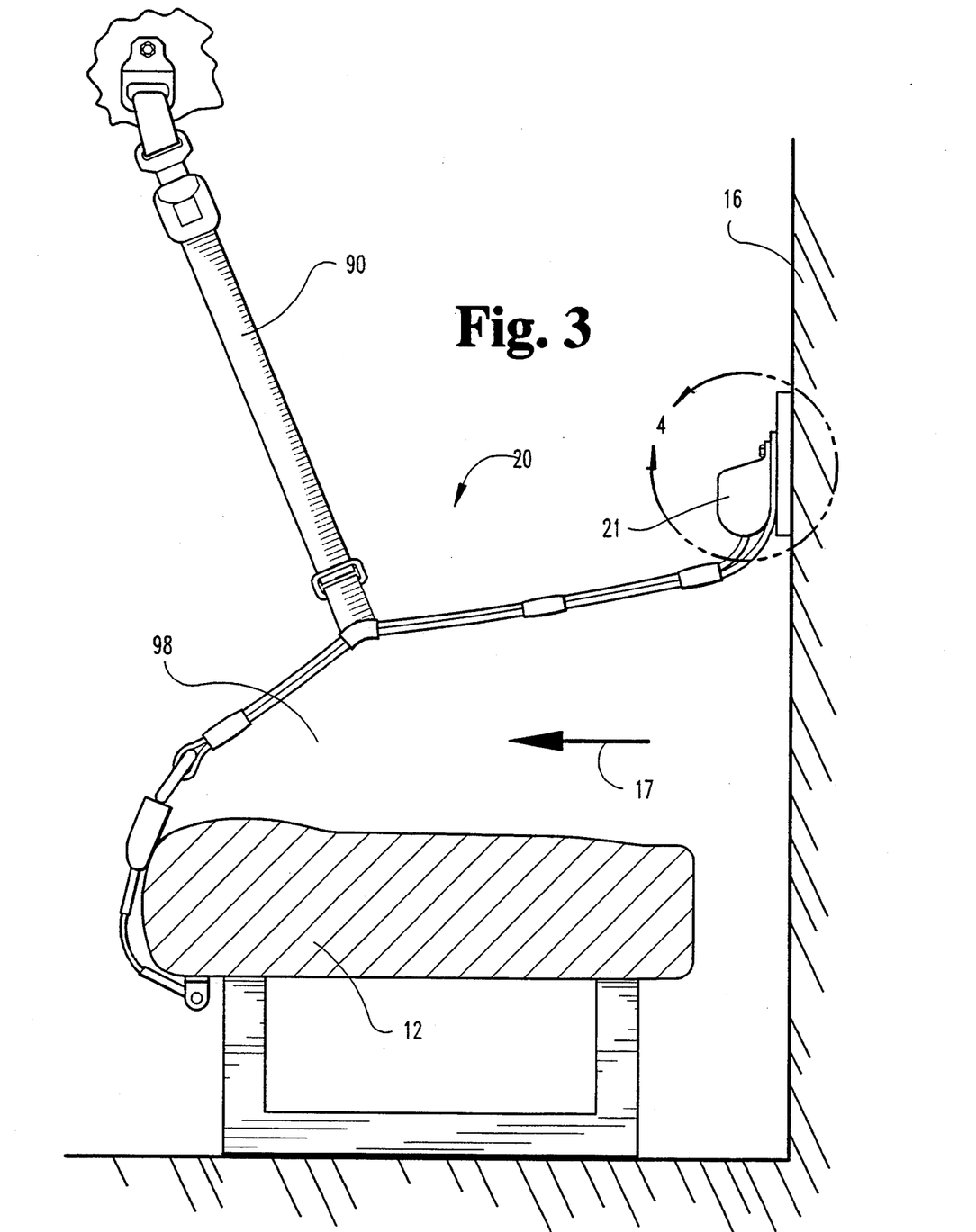
FIG. 3 is a cross sectional view taken along a line 3—3 of FIG. 1 and viewed in the direction of the arrows.

Referring now more particularly to FIG. 1, there is shown a sleeper compartment 10 provided within the cab of a tractor trailer. The compartment is formed by the floor 11 and a pair of side walls 14 and 15 extending outwardly from the rear wall 16 (FIG. 3). The normal direction of vehicle motion is shown by arrow 17. Fixedly mounted atop floor 11 is a bed 12 supported by a plurality of legs 13. In order to limit movement or the passenger reclining atop bed 12, a occupant restraint system 20 is mounted to the back wall 16 and is extendable above the bed and forwardly where it is locked in place by a plurality of belt buckles located at the forward edge of the bed. The occupant restraint system 20 is the preferred embodiment of the present invention and is shown in the in use position in FIGS. 1 and 3 and in the stored position in FIG. 2.

Three retractors 21, 22 and 23 are shown mounted to the back wall 16 to facilitate the storage of the occupant restraint system. More than or fewer than three retractors may be employed to store the occupant restraint systems. Webs 24, 25 and 26 are extendable from and retractable into respectively by retracting devices 21, 22 and 23. The retracting devices are of a non locking design with each retracting device including a spring biased spool upon which the web is wound to bias the web into the housing of the retracting device. Thus, the proximal ends of webs 24-26 are fixedly secured to the spools within respectively retracting devices 21-23. Mounted to the distal ends of webs 24-26 are respectively conventional buckle tongues 32, 33 and 34 (FIG. 2) which are lockingly engagable respectively with conventional belt buckles 35, 36 and 37 pivotally motto ted to the forward bottom edge position of seat 12.

Figure 6:
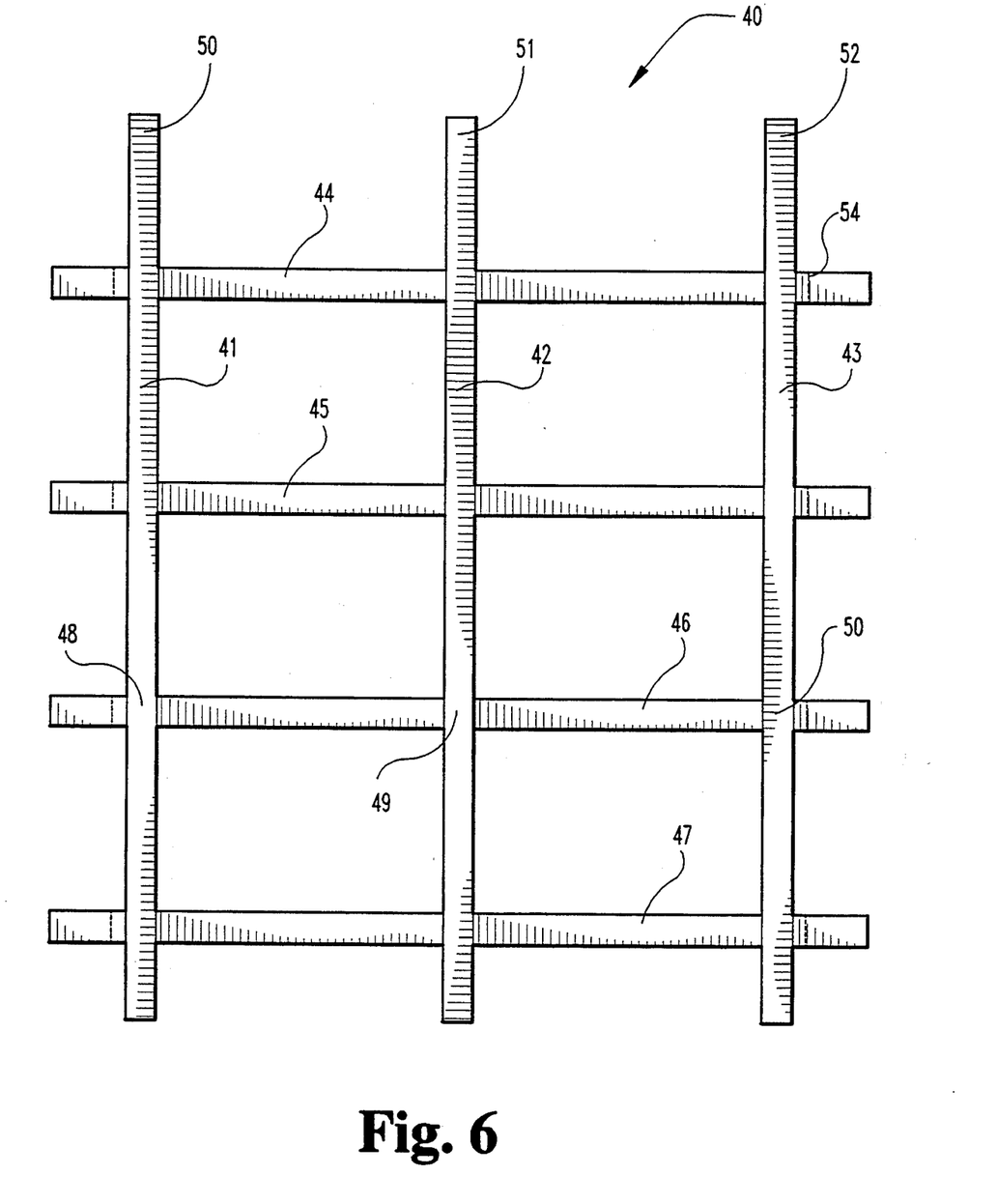
FIG. 6 is a plan view of the framework for holding the net.

A framework 40 (FIG. 6) is provided for holding the net 31 which extends across the width and length of the restraining device. The framework 40 includes flexible webs or frame elements 41, 42 and 43 fixedly fastened by stitching or other means to flexible cross webs 44, 45, 46 and 47. Cross webs 44-47 are perpendicularly arranged relative to the parallel webs 41-43 with the cross webs 44-47 being stitched to each web 41-43 at the intersection thereof. For example, cross web 46 is stitched at locations 48, 49 and 50 respectively to webs 41, 42 and 43. In similar fashion, the remaining cross webs are stitched or fastened to webs 41-43.

Figure 4:
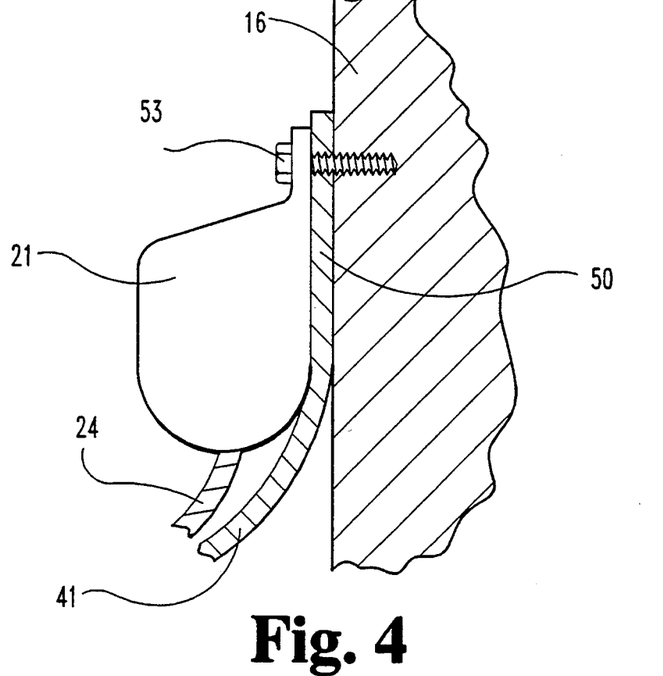
FIG. 4 in an enlarged view of the structure enclosed by circle 4 of FIG. 3.

The top portions 50, 51 and 52 of webs 41, 42 and 43 extend outwards of cross web 44 to a position between respectively retracting devices 21, 22 and 23 and the back wall 16. A conventional fastening device used to secure the retracting device to the back wall is also used to fixedly secure the; top portion of webs 50-52 to the back wall. Thus, fastening device 53 (FIG. 4) mounts retractor 21 to back wall 16 and also secures the top portion 50 of web 41 thereto.

A web, string or cord net 31 (FIG. 1) is then placed atop frame 40 and attached thereto by a plurality of additional webs which form a cover frame 27. Net 31 is shown only in fragments in FIG. 7 in order to more clearly illustrate the positioning of the additional webs for securing the net to frame 40. Cover frame 27 includes webs 60-66. Webs 60, 61 and 62 are positioned over respectively webs 41, 42 and 43 with the net located between webs 60-62 and webs 41-43. Webs 60-62 are then stitched to webs 41-43 securing the net 41 therebetween. Thus, stitching 70 and 71 (FIG. 8) secure webs 60, 41 and 45 together with net 31 located between webs 60 and 41. Likewise, stitching 68 and 69 (FIG. 9) secures together webs 61, 42 and 45 with net 31 located between webs 61 and 42.

Cover frame 27 includes a plurality of additional cross webs 63, 64, 65 and 66 stitched atop and to respectively webs 44, 45, 46 and 47 with net 31 located therebetween. Webs 63-66 secure the net to the frame 40 in the area between webs 41, 42 and 43. Likewise, webs 63-66 may be attached to webs 60 and 62 to form a one piece cover or may be individually installed on frame 40. In order to more clearly illustrate the positioning of frame 40 relative to webs 60-66, webs 60-66 have been shown as having a width smaller than webs 43-47, although in actuality webs 60-66 and 41-47 may have identical widths.

Figure 7:
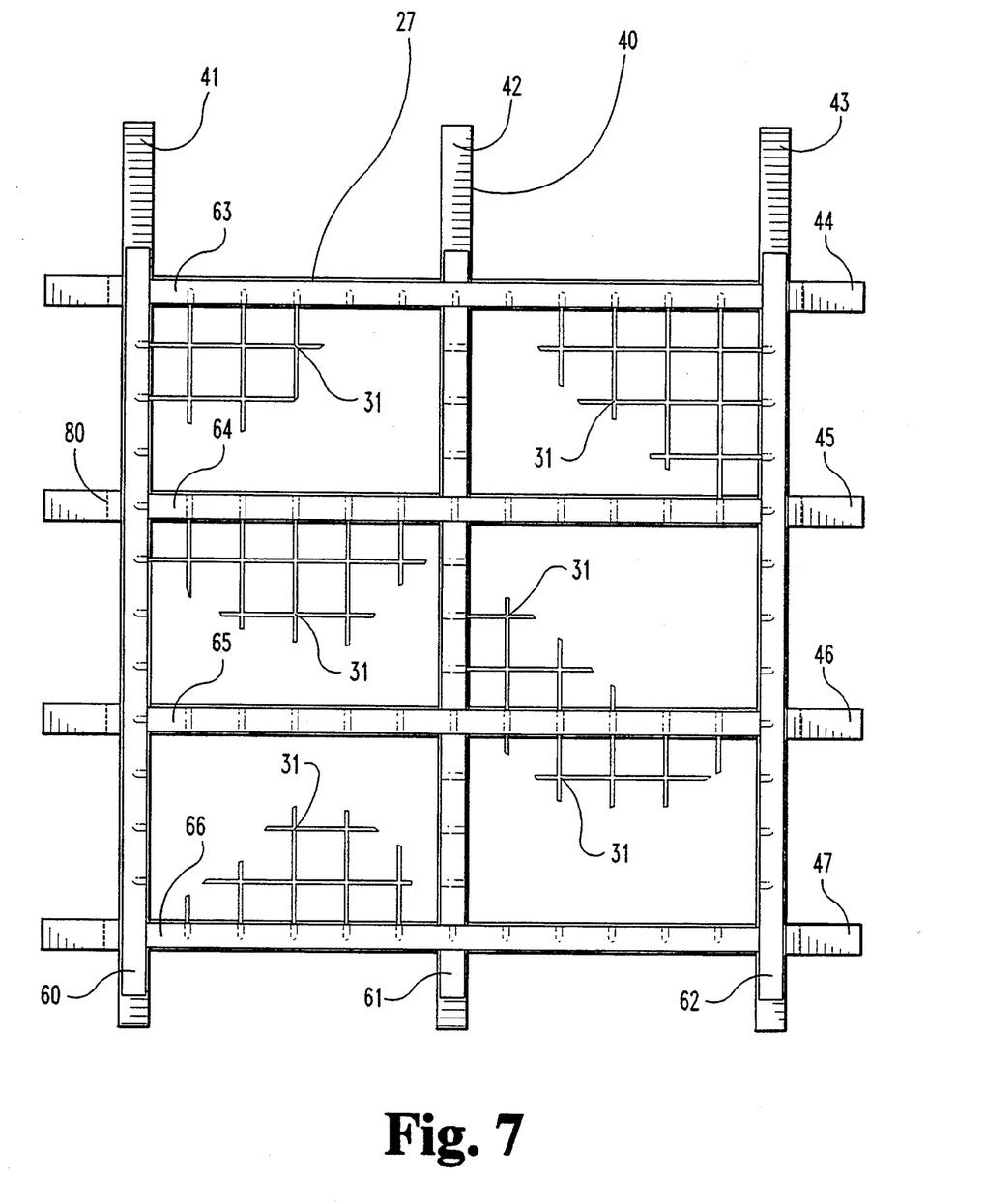
FIG. 7 is the same view as FIG. 6 only showing the net and cover frame mounted to the framework.
Figure 8:
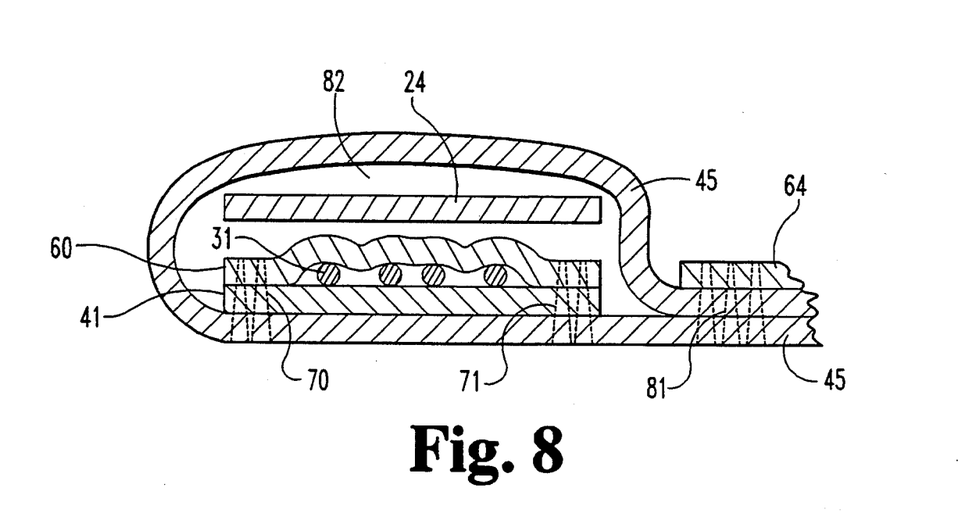
FIG. 8 is an enlarged cross sectional view taken along a line 8—8 of FIG. 1 and viewed in the direction of the arrows.
Figure 9:
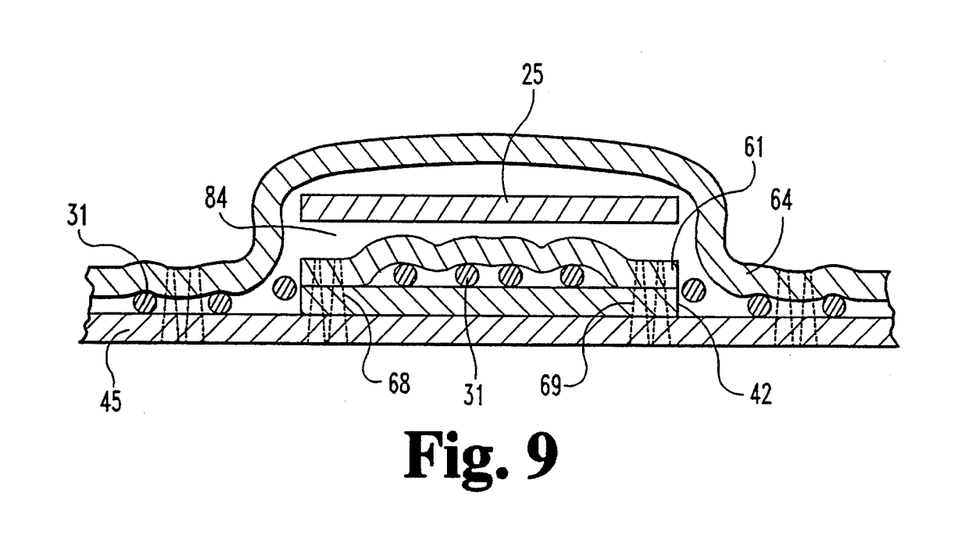
FIG. 9 is an enlarged cross sectional view taken along a line 9—9 of FIG. 1 and viewed in the direction of the arrows.

The resultant assembly shown in FIG. 7 consisting of framework 40 along with net 31 and webs 60-66 is then mounted to the webs 24, 25 and 26 and extended outwardly from retracting devices 21-23. That is, the assembly depicted in FIG. 7 is slidably mounted to webs 24-26. This is achieved by folding inwardly the outer ends of cross webs 44-47. Cross webs 44-47 extend outwardly of webs 41 and 43 and may be creased along the dash lines shown in FIG. 7 and looped back being stitched upon itself to form a loop. For example, cross web 45 may be folded along crease line 80 (FIG. 7) and then looped back on itself as depicted in FIG. 8 being stitched together and to web 64 by stitching 81. Thus, an interior space 82 is formed through which web 24 may be threaded. In a similar manner, the remaining outer ends of webs 44-47 may be looped back and stitched with webs 24 and 26 then being threaded therethrough thereby slidably mounting the assembly depicted in FIG. 7 to webs 24 and 26.

Cross webs 63, 64, 65 and 66 are stitched to webs 44, 45, 46, 47 except when webs 63-66 extend over web 42, whereat webs 63-66 are spaced upwardly apart from web 42 forming an interior space 84 (FIG. 9) through which web 25 may be threaded thereby slidably mounting the assembly of FIG. 7 to web 25.

The bottom ends of webs 60 and 41 (FIG. 7) are stitched to the bottom end or web 24 (FIG. 2) and in turn attached to buckle tongue 32. Likewise, the bottom ends of webs 61 and 42 (FIG. 7) and the bottom ends of webs 62 and 43 are fixedly secured by stitching to the bottom ends respectively of webs 25 and 26 in turn attached respectively to buckle tongues 33 and 34.

Figure 5:
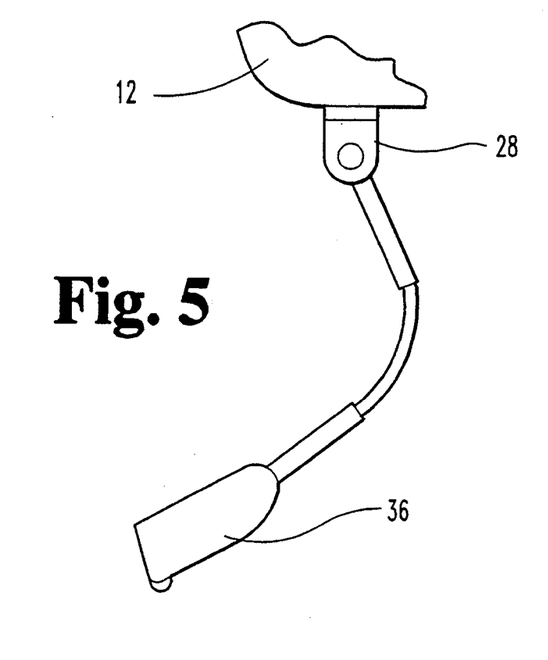
FIG. 5 is a side view of one of the buckles mounted to the bottom of the bed of FIG. 1 shown in the stored position.

Buckles 35, 36 and 37 are pivotally mounted by conventional means to the forward bat tom edge portion of seat 12. When not in use, the buckles hang downwardly beneath the seat, whereas in use the buckles may be pivotally upwardly adjacent the forward edge of the seat whereat tongues 32-34 may be pulled downwardly and lockingly engaged with buckles 35, 36 and 37. A suitable detent mechanism may be used in the pivot mounting 28 (FIG. 5) of buckles 35-37 to normally hold the buckles in either the downward storage position or the upward in use position.

Figure 10:
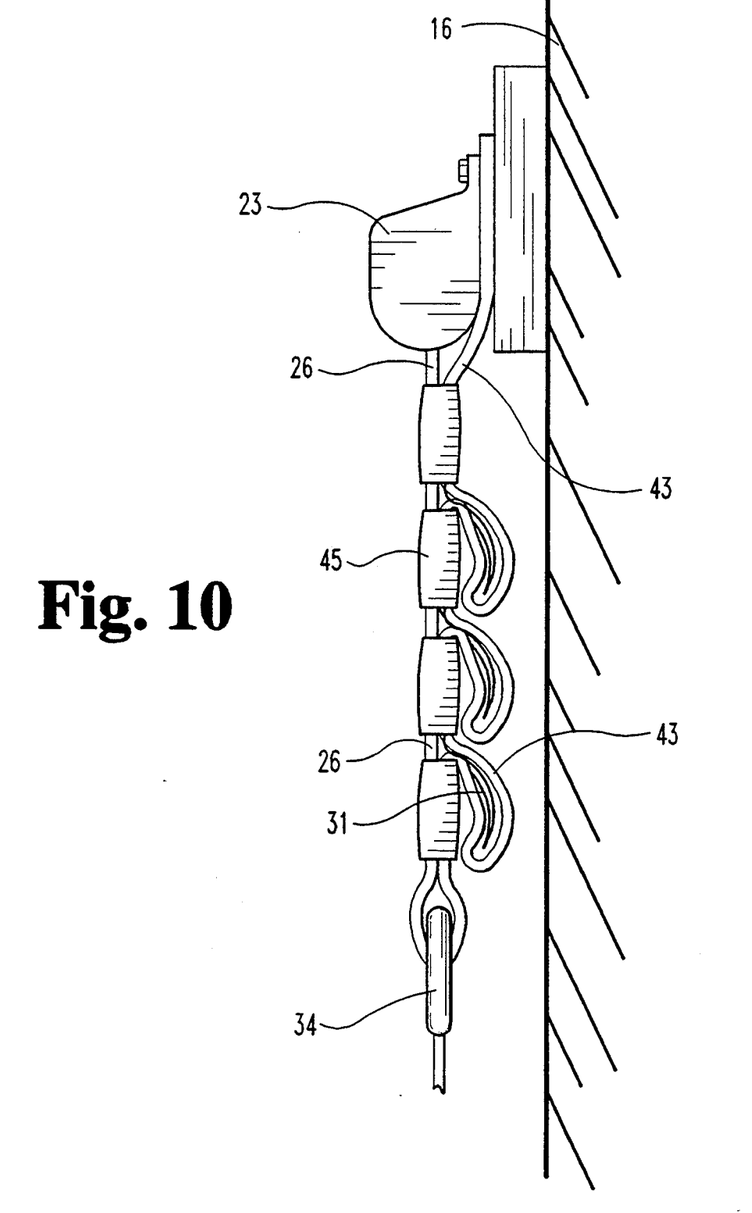
FIG. 10 is a side view of the occupant restraint system of FIG. 2.

The construction of the webbing and nets are particularly advantagous in that the net and webs are constructed in accordion fashion and assume a compact position adjacent to back wall 16 (FIG. 10) when in the stored position whereat tongues 32-34 may be grasped and pulled outwardly and downwardly allowing the net and webs to expand to the position shown in FIG. 1. Webs 41, 42 and 43 (FIG. 7) have a fixed length with proximal ends fastened to back wall 16 and with distal ends attached to buckle tongues 32-34. Webs 24, 25 and 26 have a suitable length when extended from the retracting devices to allow the net and frame 40 to extend completely from back wall 16 over and to the forward edge of the bed. On the other hand, as webs 24, 25 and 26 are retracted into the retracting devices 21, 22 and 23, frame 40 along with the net 31 and cover frame 27 making up the assembly of FIG. 7 will slide along the length of each web 24–26 allowing the cross webs 44–47 to move together while net 31 collapses and webs 41–43 assume an accordion configuration.

A pair of side belts 90 and 91 (FIG. 1) have proximal ends fastened by stitching or other means to cross web 46. The distal ends of belts 90 and 91 have respectively mounted thereto a belt buckle 92 and a buckle tongue 93. Likewise, a buckle tongue 94 and a buckle 95 are mounted respectively to side walls 14 and 15. Thus, buckle 92 may be lockingly engaged with tongue 94 whereas tongue 93 may be lockingly engaged with buckle 95. A pair of conventional belt tensioning devices 96 and 97 are provided respectively on belts 90 and 91 allowing the user to increase the tension in belts 90 and 91. Belts 90 and 91 extend upwardly toward the ceiling to side walls 14 and 15 thereby pulling web 46 and the occupant restraint system upwardly increasing the interior space 98 (FIG. 3) over bed 12 allowing the passenger more sleeping room. Notably, belts 90 and 91 are attached to the second web 46 apart from buckles 35–37 thereby pulling the occupant restraint system upwardly above the forward edge of seat 12. Belts 90 and 91 are also at the same time operable to increase the tension in webs 41 and 43 thereby providing a more taut occupant restraint system.

The occupant restraint system disclosed herein has many advantages as compared to the prior devices. Notably, the net extends from the position immediately adjacent the forward edge of the bed completely to the back wall 16 while at the same time allowing the occupant restraint system to collapse to a compact position. Thus, in the event the vehicle is inverted, the occupant restraint system extends completely to back wall 16 preventing the passenger from falling between the net and the back wall and provides maximum envelope for comfort to encourage occupant restraint use, thus allowing free movement of occupant and significant occupant restraint.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An occupant restraint system for a passenger reclining on a support in a vehicle comprising:
    a plurality of flexible frame elements having proximal ends fixedly mounted to the vehicle and further having distal ends, said elements having a stored position and an in use position;
    first fastening means mounted to said distal ends of said frame elements;
    second fastening means mounted to said vehicle with said support located between said first fastening means and said second fastening means when said elements are in said stored position, said first fastening means and said second fastening means operable to releasably lock together when said flexible frame elements are moved above and across said support from said stored position to said in use position and said first fastening means and said second fastening means are engaged together;
    a plurality of webs having said elements slidably mounted thereto and having distal ends secured to said first fastening means and further having proximal ends;
    restraining means fixedly mounted to said elements; and,
    web retraction means mounted to the vehicle and having said proximal ends of said webs mounted thereto, said web retraction means operable to retract said webs when said first fastening means and said second fastening means are separated with said restraining means sliding with said elements on said webs and collapsing into said stored position.

2. The system of claim 1 and further comprising:
    tent expansion means secured to said restraining means, said tent expansion means operable to pull said restraining means away from said support to maximize space therebetween.

3. The system of claim 1 and further comprising:
    a plurality of cross frame supports attached to said frame elements forming a framework upon which said restraining means is mounted; and,
    a cover frame mounted atop said restraining means and attached to said framework securing said restraining means therebetween.

4. The system of claim 3 wherein:
    said framework includes a plurality of loops through which said webs freely extend slidably mounting said framework with said restraining means to said webs.

5. The system of claim 4 wherein:
    said restraining means is a net.

6. An occupant restraint system for a passenger reclining on a support comprising:
    a foldable frame having a proximal end portion in a fixed position and a distal end portion movable therefrom;
    a net mounted fixedly to said frame and foldable therewith in a stored position and unfolded in an in use position over a support;
    a retraction device;
    a retracting web having a proximal end mounted to said retraction device with said web extendable and retractable therefrom, said web further having a distal end affixed to said distal end portion of said frame;
    a loop fixedly mounted to said frame with said web extending freely therethrough;
    a first lock device mounted to said distal end portion of said frame; and,
    a second lock device mounted to said support releasably lockable to said first lock device and operable to hold said frame, net and web in an unfolded condition over said support when locked.

7. The occupant restraint system of claim 6 wherein:
    said foldable frame includes a plurality of flexible bottom webs and a plurality of flexible upper webs secured together with said net affixed therebetween.

8. The occupant restraint system of claim 7 and further comprising:
    a belt affixed to said frame and extendable upwardly over said support to pull said frame and net apart from said support increasing space therebetween.

9. The occupant restraint system of claim 8 wherein:
said bottom webs include first webs positioned lengthwise on said frame and second webs positioned widthwise across said frame with said first webs and said second webs secured together.

10. The occupant restraint system of claim 9 and further comprising:
a plurality of retraction devices; and,
a plurality of retracting webs having proximal ends mounted to said retraction devices with said retracting webs extendable and retractable therefrom, said retracting webs further having distal ends affixed to said distal end portion of said frame; and whereby:
said second webs extend outwardly of said first webs and are doubled back forming a plurality of loops throughwhich said retracting webs extend freely therethrough.

11. The occupant restraint system of clam 10 wherein:
said plurality of retracting webs include a middle retracting web having a proximal end mounted to one of said retraction devices with said middle retracting web extendable and retractable therefrom, said middle retracting web further having a distal end affixed to said distal end portion of said frame; and wherein:
said upper webs and said bottom webs are spaced apart from said middle retracting web forming a loop through which said middle retracting web extends freely therethrough.

12. An occupant restraint for use with a bed in a truck cab comprising:
foldable frame means having a proximal end portion mounted to said cab and a distal end portion movable therefrom;
restraining means mounted fixedly to said frame means and foldable therewith in a stored position and unfolded in am in use position over said bed;
retraction means mounted to said cab;
web means having a proximal end mounted to said retraction means with said web means extendable and retractable therefrom, said web means further having a distal end affixed to said distal end portion of said frame means;
guide means fixedly mounted to said frame means with said web means extending freely therethrough;
first lack means mounted to said distal end portion of said frame means; and,
second lock means mounted in said cab on a side of said bed oppositely of said retraction means, said second lack means operable to releasably lock to said first lock means and hold said frame means, restraining means and web means in an unfolded condition over said bed.

13. The occupant restraint of claim 12 wherein:
said foldable frame means is flexible and includes a plurality of flexible webs secured together upon which said restraining means is mounted, said restraining means includes a net.

14. The occupant restraint of claim 13 and further comprising:
tent expansion means mounted to said cab and connected to said frame means operable to pull said frame means and said restraining means upwardly from said bed to increase the space between said bed and said restraining means.

15. The occupant restraint of claim 14 wherein:
said guide means includes a plurality of loops on said frame means with said web means threadedly and slidably extending therethrough.

* * * * *

UNITED STATES PATENT AND TRADEMARK OFFICE
CERTIFICATE OF CORRECTION

PATENT NO. : 5,375,879
DATED : December 27, 1994
INVENTOR(S) : Jeffry L. Williams and Keith H. Freeman It is certified that error appears in the above-indentified patent and that said Letters Patent is hereby corrected as shown below:

```
Column 1, line 51 delete "tinge" and insert --time--.
Column 3, line 10 delete "or" and insert --of--.
Column 3, line 34 delete "motto" and insert --mounted--.
Column 3, line 35 delete "ted".
Column 4, line 13 delete "43-47" and insert --41-47--.
Column 4, line 49 delete "bat tom" and insert --bottom--.
Column 8, line 3 delete "am" and insert --an--.
Column 8, line 17 delete "lack" and insert --lock--.
```

Signed and Sealed this

Second Day of May, 1995

Attest:

BRUCE LEHMAN

*Attesting Officer*   *Commissioner of Patents and Trademarks*